US007331860B2

(12) United States Patent
Herrmann et al.

(10) Patent No.: US 7,331,860 B2
(45) Date of Patent: Feb. 19, 2008

(54) GAME OF SKILL AND CHANCE AND SYSTEM AND METHOD FOR PLAYING SUCH GAME

(75) Inventors: Mark E. Herrmann, Wellesley, MA (US); Steven N. Kane, Brookline, MA (US); Stuart Roseman, Boston, MA (US); Jason Yanowitz, Amherst, MA (US)

(73) Assignee: GameLogic Inc., Waltham, MA (US)

( * ) Notice: Subject to any disclaimer, the term of this patent is extended or adjusted under 35 U.S.C. 154(b) by 0 days.

(21) Appl. No.: 10/962,181

(22) Filed: Oct. 8, 2004

(65) Prior Publication Data

US 2005/0116411 A1 Jun. 2, 2005

Related U.S. Application Data

(60) Provisional application No. 60/515,757, filed on Oct. 29, 2003.

(51) Int. Cl.
*A63F 9/04* (2006.01)
*A63F 13/00* (2006.01)
*G07F 17/34* (2006.01)

(52) U.S. Cl. .......................... 463/16; 463/17; 463/20; 463/22; 463/25; 273/274; 273/146; 273/143 R

(58) Field of Classification Search ............ 463/16–20, 463/22, 25; 273/274, 146, 143 R, 138.2
See application file for complete search history.

(56) References Cited

U.S. PATENT DOCUMENTS 6,173,955 B1 * 1/2001 Perrie et al. ................. 273/146
6,605,001 B1 * 8/2003 Tarantino ..................... 463/22

OTHER PUBLICATIONS

"Poker Dice", The Way To Play, Diagram Group, Paddingtion Press LTD, 1975, p. 167.*

* cited by examiner

*Primary Examiner*—Benjamin Layno
(74) *Attorney, Agent, or Firm*—Lowrie, Lando & Anastasi, LLP

(57) ABSTRACT

A game of skill and chance is provided in which five die are manipulated by a player to obtain different combinations. The obtained die combinations are then recorded on a card and scored by a computer. Players play against each other and the winner is the individual with the highest total score.

33 Claims, 8 Drawing Sheets

GAME OF SKILL AND CHANCE AND SYSTEM AND METHOD FOR PLAYING SUCH GAME

RELATED APPLICATIONS

This application claims priority under 35 U.S.C. §119(e) to U.S. Provisional Application Ser. No. 60/515,757 entitled "GAME OF SKILL AND CHANCE AND SYSTEM AND METHOD FOR PLAYING SUCH GAME," filed on Oct. 29, 2003, which is herein incorporated by reference in its entirety.

FIELD OF THE INVENTION

The present invention relates to a game of skill and chance and, more particularly, to methods of and systems for playing such game.

DESCRIPTION OF THE RELATED ART

Dice are commonly used in games of skill and/or chance. Two common dice games include craps and "Yahtzee" (Yahtzee is a registered trademark of Hasbro, Inc. of Pawtucket, R.I.). Craps is a common casino game using two dice that is basically a game of chance. Experienced craps players usually have studied the craps game and understand the nuances of the game to place their odds of winning versus the house as much in their favor as possible.

Yahtzee is a popular family game that is over forty years old and combines both skill and luck using five dice. The basic rules of Yahtzee are as follows:

To win the game, a player must earn the highest score (points) on a single card.
To earn points, the player rolls the dice and tries to match the combinations provided on the card.
There are a total of 13 combinations. Each combination may only be claimed by the player once per card.
Five standard six-sided dice are used in the game of Yahtzee. Each of the six sides of the dice is numbered 1 through 6, respectively.
There are 13 rounds in the game of Yahtzee, and during each round the dice can be rolled three times.
When a round begins, the dice are rolled. The player decides which dice to hold before the second and third rolls of the round.
After the third and final roll of the round, the player checks his/her dice. If any of the dice match the combinations on the card, the player may claim the matched combination.
If the player finds his/her dice match a combination at any time during the round, (i.e. before the end of the round), the player may score the combination immediately to finish the round.
The player may only collect one combination per turn.
Each combination may be claimed only once per game per player.
Below are the combinations, their descriptions and how many points the combinations are worth:
  1s—one or more dice show a 1: sum of dice matching 1
  2s—one or more dice show a 2: sum of dice matching 2
  3s—one or more dice show a 3: sum of dice matching 3
  4s—one or more dice show a 4: sum of dice matching 4
  5s—one or more dice show a 5: sum of dice matching 5
  6s—one or more dice show a 6: sum of dice matching 6
  3 of a kind—three dice match: sum of matching dice
  4 of a kind—four dice match: sum of matching dice
  Full House—three dice match and two dice match: 25 points
  Small Straight—four dice in sequence: 30 points
  Large Straight—all dice in sequence: 40 points
  5 of a kind—all dice match: 50 points
  Chance—any random dice: sum of dice
If a player cannot claim a combination after the third roll, then the player must choose which available combination to score a zero.
As well as earning points for matching the combinations, the player can collect the following Bonus Points:
  If the total of the points collected for the combinations 1s through 6s is greater than or equal to 63 points, the player receives a bonus of 35 points.
  After the player has claimed his/her first 5 of a kind, the player will automatically receive 100 bonus points every time the player rolls an additional 5 of a kind. The player can then use the dice to claim any available combinations.
After the 13th round, the player(s) with the highest score is/are the winner(s).

There is a present and recurring need for new games of skill and chance that are easy to understand and are easy to play. Such a game is needed to attract new game players and to provide existing players with another game of skill and chance.

SUMMARY OF THE INVENTION

According to one aspect of the invention, a game having an associated game session to be played by a plurality of players is provided. The game session comprises one or more cards played by each of the plurality of players and two or more dice, wherein each one of the one or more cards shows dice combinations that can be chosen, and wherein each game comprises acts of A) rolling the two or more dice, B) choosing, by at least one of the plurality of players, zero or more of the two or more dice to not roll again, C) if necessary, rolling the dice not chosen, D) repeating steps B and C, and E) choosing, by the at least one of the plurality of players, at least one of the dice combinations on the one or more cards in which to score a final dice combination. According to one embodiment of the invention, the player pays to play with at least one of money and loyalty points. According to another embodiment, the player pays by at least one of cash, a debit card, a credit card, an account credit and a loyalty program credit. According to another embodiment, at least one of the plurality of players is allowed to create a subscription to play multiple game sessions.

According to one embodiment of the invention, at least one of the plurality of players is allowed to automatically renew the subscription. According to another embodiment, the payout for winning to a winning player is increased with increased payment by the winning player to play. According to another embodiment, the payout for winning is divided among all of one or more winning players. According to another embodiment, there is at least one progressive jackpot. According to another embodiment, the payout table is not directly determined by the odds of winning with or without a fee to the gaming operator. According to another embodiment, the payout for winning may be at least one of money, credit, merchandise, and loyalty points. According to another embodiment, the payout for winning money is performed by providing at least one of cash, a check, a debit card, and an account credit.

According to one embodiment of the invention, the payout for winning loyalty points is performed by providing at least one of a loyalty program credit and an account credit. According to another embodiment, game sessions are run continually. According to another embodiment, a winning player among the plurality of players and a winning game card are verified and authenticated by at least one of the gaming operator and a computer system that conducts the game session. According to another embodiment, a game playing computer system displays to all players at least one of the winning game card and the winning player. According to another embodiment, a game playing computer system determines at least one of a game card or a player with the highest score following each roll of the two or more dice. According to another embodiment, a game playing computer system automatically notifies a player of winnings.

According to one embodiment of the invention, at least one of the plurality of players may access his/her results for past gaming sessions at a location remote to the game playing computer system. According to another embodiment, the results for past gaming sessions include indications of at least one of wins, payouts, and losses. According to another embodiment, the at least one player gains remote access through at least one of a group including a kiosk, a phone, a handheld device, a television and a computer. According to another embodiment, the games are run continually, and wherein one or more advertising streams are inserted into the display during the game session. According to another embodiment, the player may enter a game through an alternative method of entry (AMOE). According to another embodiment, each of the plurality of players is provided two or more cards. According to another embodiment, each game session includes a winning player.

According to one embodiment of the invention, at least one of the plurality of players pays over the Internet, by phone, or by cashier. According to another embodiment, the player pays to play in the game session at least one of a casino and a lottery outlet. According to another embodiment, the game includes performing acts A through E for a number of times equal to the number of dice combinations on at least one of the one or more game cards. According to another embodiment, the player is provided a predetermined amount of time to select dice to keep before the dice not chosen are rolled again. According to another embodiment, the game session is conducted without interaction with at least one of the plurality of players. According to another embodiment, at least one of the plurality of players is determined to be a winning player by accruing the most points among the plurality of players. According to another embodiment, the initial dice combination is the same for each one of the one or more cards. According to another embodiment, the initial dice combination is different for each one of the one or more cards.

Further features and advantages of the present invention as well as the structure of various embodiments of the present invention will be more fully understood from the examples described below with reference to the accompanying drawings. The following examples are intended to illustrate the benefits of the present invention, but do not exemplify the full scope of the invention. All references cited herein are expressly incorporated by reference.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

While popular with experienced players, the common casino game of craps is unpopular with the average gaming player because of the unique confusing vocabulary and large number of choices (and thus odds) for betting.

Figure 8:
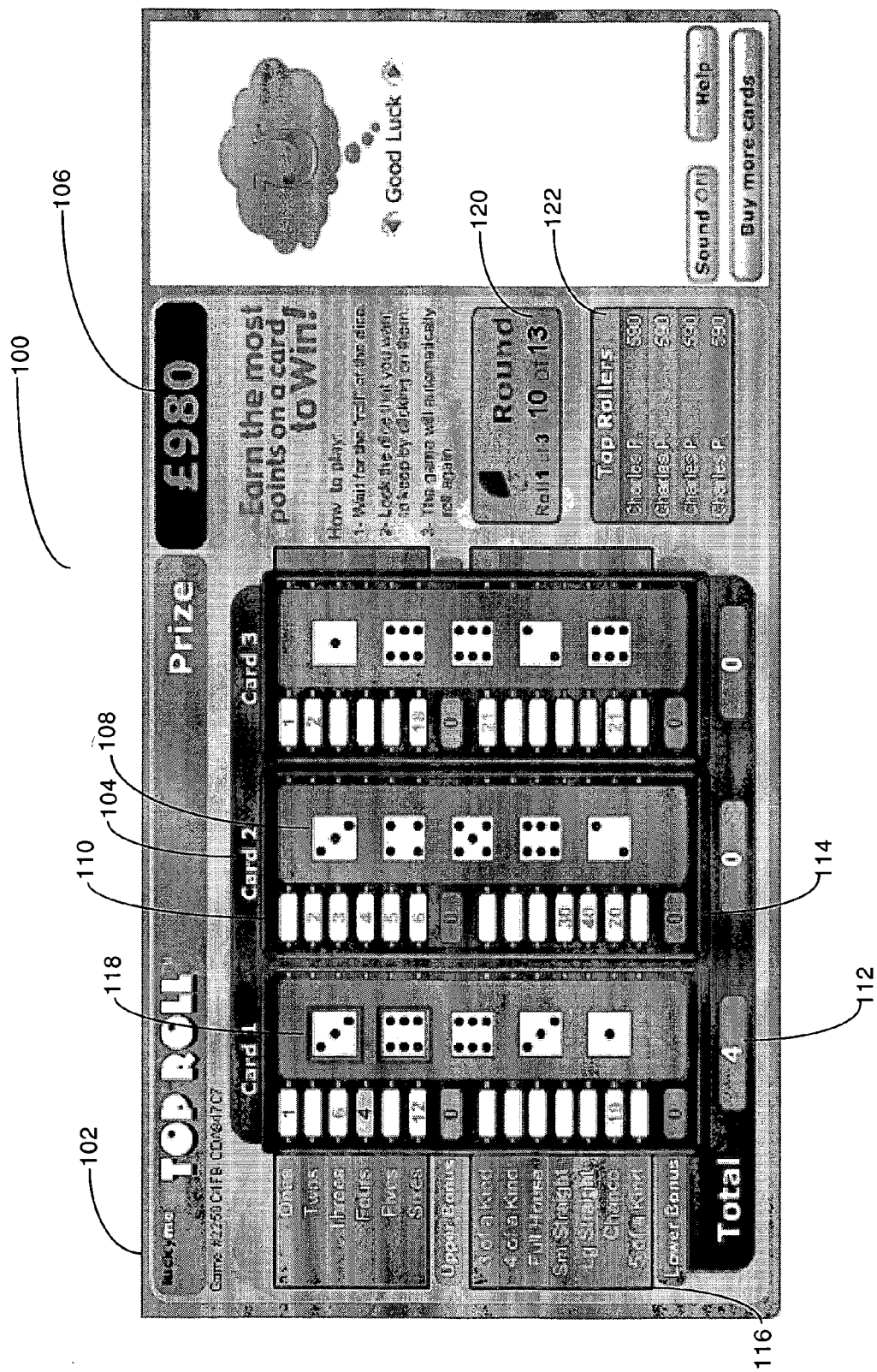
FIG. 8 is a diagram of a game interface according to one embodiment of the invention.

To overcome this issue, one aspect of the present invention relates to a new game that includes elements of the well-known dice game of skill and chance known as "Yahtzee." Unique aspects of the invention that make the invention attractive for online gaming include:

each player may play one or more cards at a time to win, a player must have the highest score on a single card; and players play against each other in real time players choose what to do substantially simultaneously based upon each card's specific dice combination FIG. 8 shows an example of a game interface according to one embodiment of the present invention. The game 100 may include a presentation of an interface screen 102 that includes, for example, three cards. Such an interface screen may be rendered by a general-purpose computer system as described in more detail below. Each card 104 can include a scoring line 110 for the game combinations 116 and, optionally, its own set of five dice 108. It should be appreciated, however, that game 100 may include any number of cards, and the invention is not limited to any particular game combinations or number of cards.

The game combinations within any game may be similar to those of the well-known Yahtzee game. Alternatively, the combinations may be different than those of the Yahtzee game. For example, the 1s through 6s combination may not be able to have a non-zero score unless at least two of the particular number occurs in the dice combination.

After the dice is rolled for the first time in each round, the player may select any die to hold as indicated in this case by the square 118. Selection of a particular can occur within the through single- or double-clicking on the die. A player may also deselect any die through a similar action. In one embodiment, the game may limit the amount of time the player has to choose by automatically rolling the non-selected dice after a pre-determined period of time, e.g. 8 seconds or 1 minute.

In one embodiment, the interface screen 102 may display to the player the number of the round and the roll of the round as shown by 120. Game screen 102 can also indicate the prize 106 currently being played for and the current high scorers 122 for the game being played. A combination that already has been scored for a card can be highlighted in interface 102 as shown, for example, in the "Fours" combination for Card 1. Additionally, the scoring possibilities for the dice can be shown by the computer to the player in the scoring line 110. A player can choose which combination to score by selecting the score (e.g., by clicking on the score) to record. It should be appreciated that various aspects of the invention discussed above and shown in FIG. 8 may be used independently or in any combination with these or other features.

Figure 1:
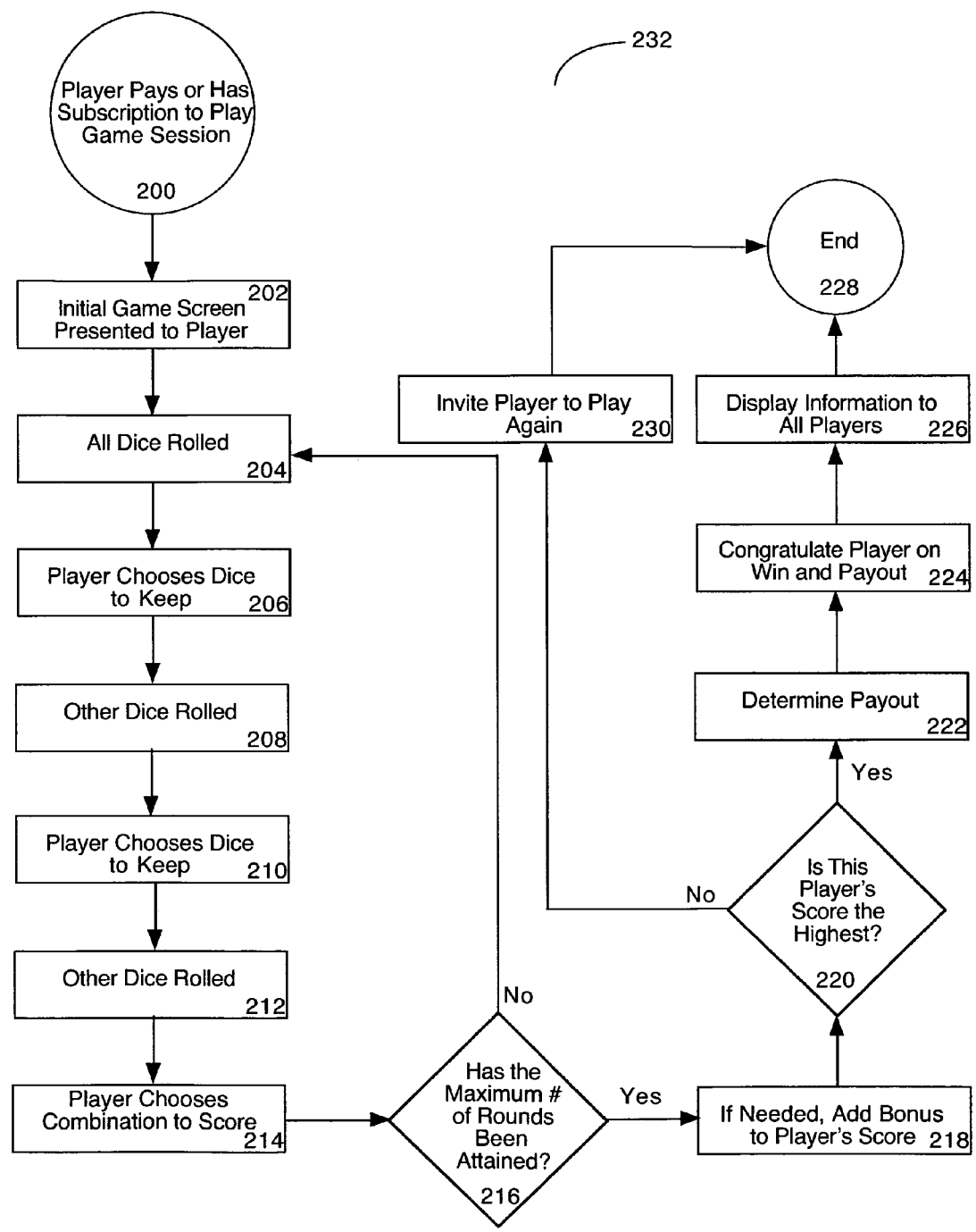
FIG. 1 is a diagram showing a flow chart of a process for playing a game card according to one embodiment of the invention.

FIG. 1 shows an example process for conducting a dice-based game according to one embodiment of the present invention. After the player pays or subscribes to play at block 200, the player may be presented an initial game screen at block 202. According to one embodiment, the computer automatically rolls the dice with the outcome determined, for example, by random number generation at block 204. At block 208, the player chooses which dice to keep (block 206) and the computer then rolls the non-chosen dice. The player once again chooses what dice to keep (block 210) and the rest of the dice are then rolled once again (block 212). Based upon the combination of dice, the player chooses how to score the round at block 214. If the maximum number of rounds has not been played, the game continues by the computer rolling all of the dice again at block 204.

If the maximum number of rounds have been played, then the computer automatically adds any bonuses to the player's score at block 218. The computer, at block 220, determines if the player has the highest score for the game. If the player does not have the highest score, then the computer invites the player to play again (at block 230) and the game ends at block 228.

If the player has the highest score, then the computer determines the payout as determined by the predetermined payout table (at block 222). Further, the system may optionally congratulate the player for the win, inform the player of payout, and/or tell all the players who the winner(s) is/are, and the associated payout at blocks 224 and 226. At block 228, the game ends.

FIG. 1 is merely an illustrative example of a process for conducting a dice-based game. Acts may occur in a different order, e.g. act 218 may occur immediately after act 214. Acts may also be added, deleted or changed. For example, acts 210 and 212 may not be necessary in one, some or all rounds. The computer can also add steps of determining the highest score after a round and displaying that to one, some or all the players.

Prior to a game, a game player may need to pay for playing. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The game player may pay-in person (e.g., by using a cashier in a casino) or through other remote means including telephone, handheld device, kiosk, computer through the Internet or other network, and mail.

In one embodiment of the invention, players may subscribe to play multiple consecutive game sessions. That is, the player pays at one time to play more than one game. These games may be consecutive games, periodically distributed over a period of time, or other distribution. According to one embodiment, such players may subscribe to multiple games using a computer-based interface (e.g., a personal computer, cell phone, PDA, set-top box or other interface), using a telephone, or by subscribing through a cashier (e.g. at a casino, lottery outlet, etc.). In another embodiment, the player may also choose to have his or her subscription automatically renewed.

According to one embodiment of the invention, players may also enter to play this or any other wagering game of chance using an alternative method of entry (AMOE). AMOE is a required available method of entry that does not require a purchase to enter a sweepstake; sweepstakes are usually used as a promotional or marketing tool. An individual entering a sweepstakes by AMOE is required by law to have the same odds of winning each of the available prizes.

A common AMOE method is to have an individual interested in entering the sweepstakes send in a post card with his or her name, address or other contact information. Another AMOE method is to have an individual sign on to a free Internet website and submit the required information without payment of a fee. Numerous other methods may be used for AMOE. Most sweepstakes limit the number of times one individual or family may enter a sweepstakes by AMOE.

According to one embodiment of the invention, it is realized that an AMOE (alternative method of entry) may be used to enter a game of chance. More particularly, it is possible to develop, implement and run wagering games of chance, including the inventive games described herein, with an AMOE method of entry. AMOE methods are conventionally used to enter a player in a sweepstakes, which is not considered wagering or gambling. Thus, according to one embodiment of the invention, an individual may enter the wagering game of chance by AMOE using, for example, the post card or the online method outlined above. The wagering game of chance player entering by AMOE may also have the same odds to win the payout associated with the game in which they are entered. The wagering game of chance player entering by AMOE may also be limited to a small number of games within a given period of time, for example one game in one year or two games in one month. Other numbers of sessions and given periods may be any number, and the invention is not limited to any particular implementation.

According to one embodiment, the game that the game player entering by AMOE is entered into may be determined by the game player on the AMOE entry form. For example, a post card AMOE may be required to state the date and the time of the game that the game player wants to enter. Alternatively, the game entered may be the next starting game after the AMOE is received and logged. As another alternative, AMOE entries may be assigned to a specific game(s) each hour, day, week or other time interval.

According to one embodiment, a game also includes a predetermined payout table associated with the game. The payout table may include a listing of the possible methods of obtaining a payout and its payout amount. The payout amount for each way to win may depend upon but may not be rigidly determined by the odds of obtaining the particular way to obtain a payout. The payout amount may depend, for example, on a payout ratio. The payout ratio may specify the payout amount in relation to the amount wagered.

The payout table may also have adjustments for a player's subscription. More particularly, the payout may be adjusted according to the player's subscription level. For instance, the payout may increase if the player has a multiple game subscription, multiple card subscription, high payment per game card or any combination thereof. The payout may also be adjusted for numerous other criterion including frequent player credits. Of course, all payout adjustments must meet any legal requirements for the gaming jurisdiction in which the game is played.

The payout table for each game may also be supplemented by a jackpot that transfers from game session to game session. These types of jackpots are commonly called rolling or progressive jackpots. A rolling jackpot may be, for example, the same amount that transfers from game to game until the jackpot is paid out. A progressive jackpot is a rolling jackpot that increases as more games, game cards or other criterion are played.

The final payout may also be affected as to whether the game has a fixed payout for a win or whether the payout is shared. The final payout may also be affected by bonus play, which is well-known in the gaming industry. Bonus play generally works to increase some payouts by offering the chance to multiply a payout.

One or more game sessions may proceed concurrently. Parameters of the concurrent games may be the same, similar, or different. Additionally, the games may run continually, i.e. one after another. When one game ends, another session may begin immediately, in a short period of time, or after any other delay. The games may follow a precise time schedule so that players know when game sessions begin. For example, if play in a game requires four and a half (4.5) minutes to complete, then the next game session may start immediately (or after delay, e.g., thirty seconds) to keep to a schedule of games every five minutes at :00, :05, :10, :15, :20, :25, :30, :35, :40, :45, :50, :55 of each hour. Because the games may run continually, it may be possible that a particular game session has no game player or game card that is being played in it.

During the period of time between game sessions, a game operator may make announcements, rest, or any number of actions. If the game is played using a computer system, advertisements, sponsorships, public service announcements or any visual or auditory content may be inserted, for example, into one or more of these periods of time. Advertisements or other content may also be inserted into the game display during a game session.

If the computer automatically plays the games for the players, a game player may access information regarding results of a game remotely after the game is completed. In this manner, a player need not attend or view a particular game session, as the results of each session may be accessed at a later time. Further, the player need not access the game session results from the same interface at which the game was played or subscribed. Remote access may be gained, for example, by kiosk, telephone, television, computer, handheld device or any other device or system that is appropriate. Information that may be accessed about a past game session may include, for example, whether the player won or lost, what the player's payout was or any other information relating to the past game session.

A game player may also be able to replay or review a past game session using a game replay device including kiosk, telephone with display, television, computer or handheld device. By accessing the proper game in the computer system, a game player may be able to see a past game session as it occurred, the winning cards and winning game player identity(ies), or possibly any other aspect of the game of interest.

Preferably, according to one embodiment of the invention, game play and betting are partially or fully automated using one or more computer systems. In another embodiment of the invention, game play and betting are fully automated. A computer system may be a single computer capable of executing one or more functions of a game. For instance, the computer may be a supercomputer, minicomputer or a mainframe or personal computer. A computer system used to run a game and its associated sessions may also include any combination of computer system types that cooperate to accomplish system-level tasks. Multiple computer systems may also be used to run a game. The computer system also may include one or more input or output devices, displays, or storage units.

A computer system that executes a game according to various embodiments of the invention may include, for example, three system components. One system component may handle payment, subscription and/or AMOE by players to enter the game sessions. Another system component may perform functions relating to playing and viewing the game and the third system component may perform functions relating to performing payouts. Such a game system may also be coupled (e.g., by direct line or network) to other computer systems including systems for handling casino or hotel loyalty programs, reservations, in-room television viewing, gambling floor kiosks, or other systems. Connections to other computer systems may be performed using one or more of the system components described below.

Figure 2:
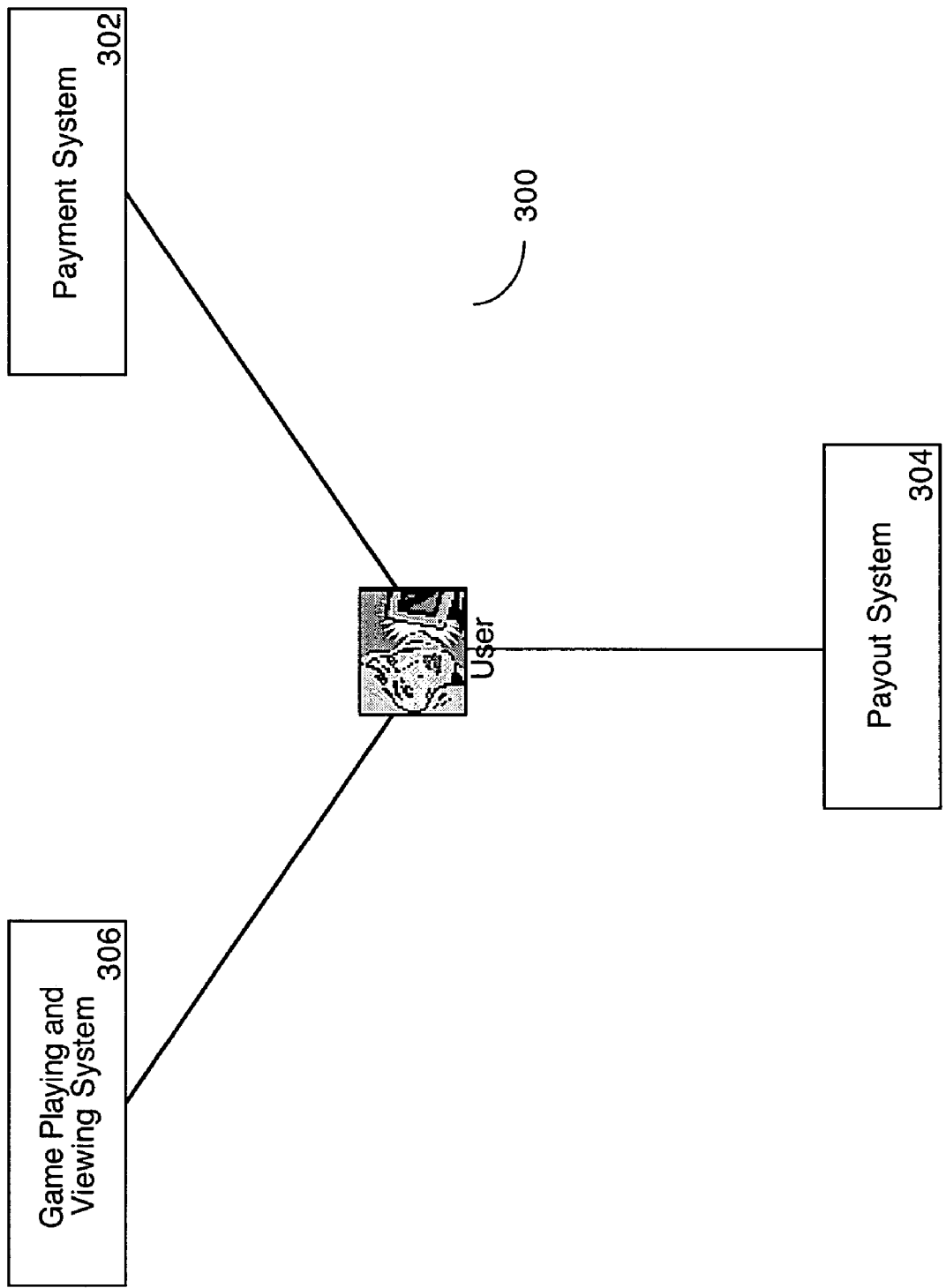
FIG. 2 is a diagram showing components of the game computer system according to one embodiment of the invention.

A computer system (Item 300 of FIG. 2) to run the described game may include one or more component systems. One system 302 may handle payment, subscription and/or AMOE by players to enter the games. Another system 306 may handle playing and viewing the game and the third system 304 may handle payouts. The game system may also be connected by direct line or network to other computer systems including systems for handling casino or hotel loyalty programs, reservations, in-room television viewing or gambling floor kiosks. Connections to other computer systems may be performed using one or more of the system components described below.

Figure 3:
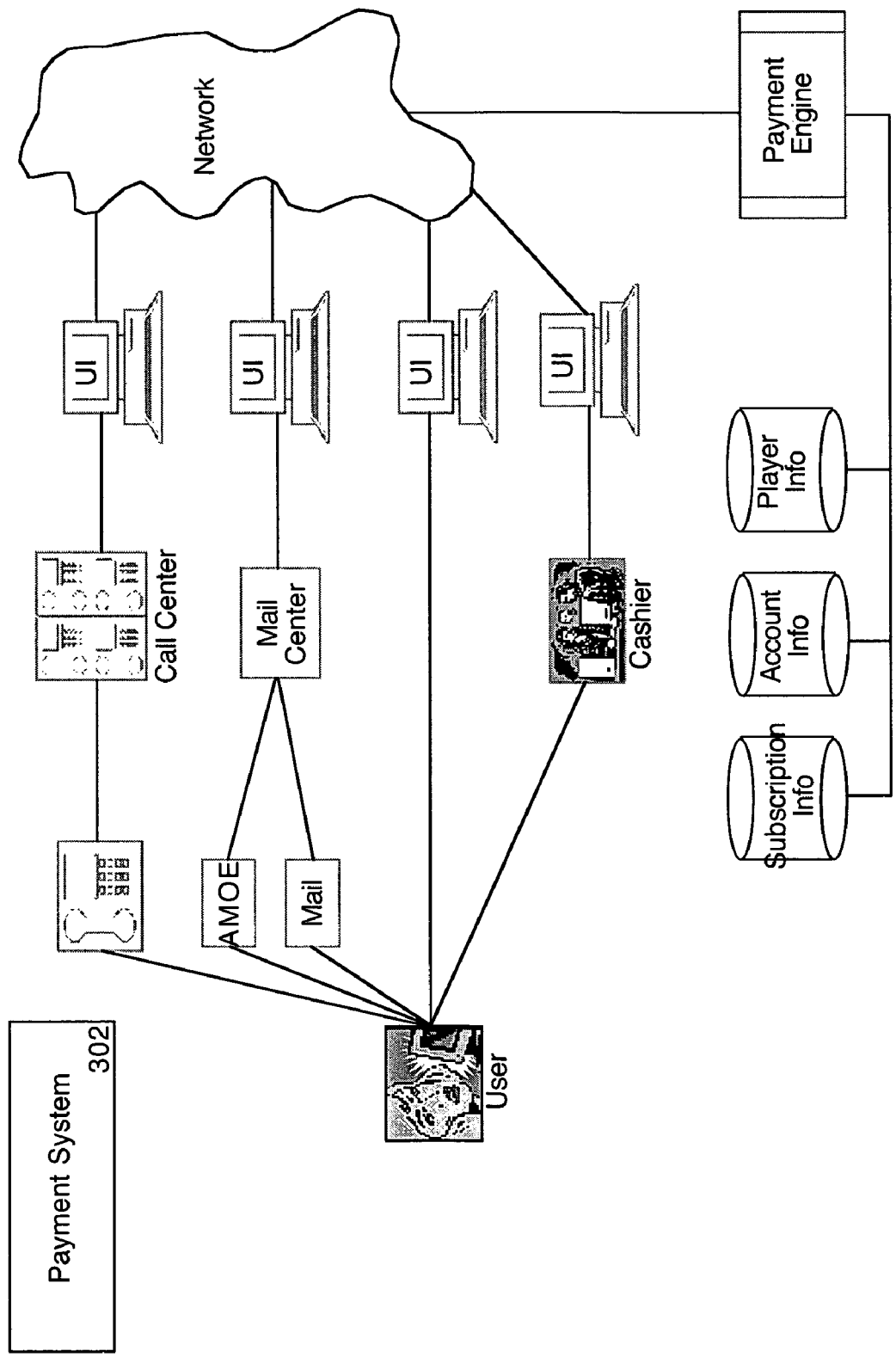
FIG. 3 is a diagram showing components of a game payment subsystem according to one embodiment of the invention.

The payment system (FIG. 3) may be one or many of a number of well-known systems. For example, a player may be able to pay using a telephone and talking with a call center representative that inputs player, payment and subscription information into a computer data structure using a user interface. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interfaces (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

The player information that may be input includes name, address, telephone number and age. Payment information may include credit or debit card number or loyalty account information. Subscription information may include first game date and time, number of games to play, number of cards per game and bet per card. Based upon the payment and subscription information, the call center representative would then verify that the payment information is valid and enough credit or funds is available for the player's desired subscription.

A similar system may exist for players entering using the mail or a post card AMOE except the call center may be replaced by a mail center with representatives entering information into a data structure using a user interface. For example, a cashier that works at a casino with players to pay cash to play, may also have the ability to input player, account and subscription information using a user interface of a computer system.

Computer systems or pay engines for handling electronic or online payment and subscriptions may also be used. Such systems are well-known including PayPal, iKobo, Verisign, and other systems. Using such a system, a player interacts directly with the user interface to input information into the payment data structure that may be transferred to one or more payment systems (e.g., PayPal).

Various pay systems and one or more user interfaces may be located on computer systems coupled by a network, with the computer system(s) storing data including player, account and subscription information. As used herein, a "network" or a "communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

The above is merely an illustrative embodiment of a pay system. Such an illustrative embodiment is not intended to limit the scope of the invention, as any of numerous other implementations of a pay system, for example, variations of online payment, are possible and are intended to fall within the scope of the invention. For example, the payment system may include using pay-per-view systems associated with interactive television or the pay engine may additionally deliver a receipt to the player by either e-mail or mail. None of the claims set forth below are intended to be limited to any particular implementation of the pay system unless such claim includes a limitation explicitly reciting a particular implementation.

Figure 4:
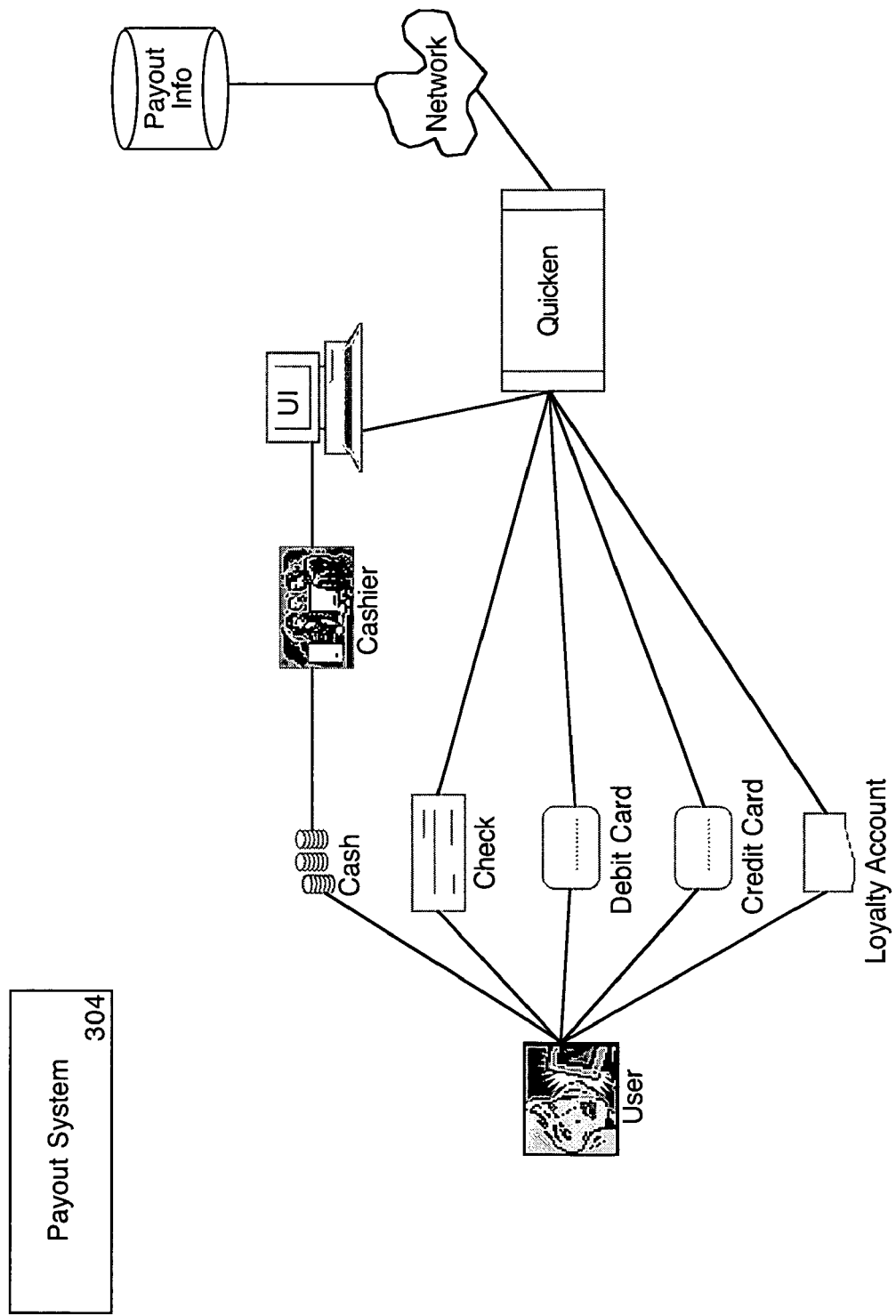
FIG. 4 is a diagram showing components of a game payout subsystem according to one embodiment of the invention.

Payout systems (e.g., FIG. 4) are also well-known. Any of a number of standard systems or payout engines for making payouts for winning may be used. For example, a standard application programming interface such as 'Quicken' (Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of the pay system unless such claim includes a limitation explicitly reciting a particular implementation.

Figure 5:
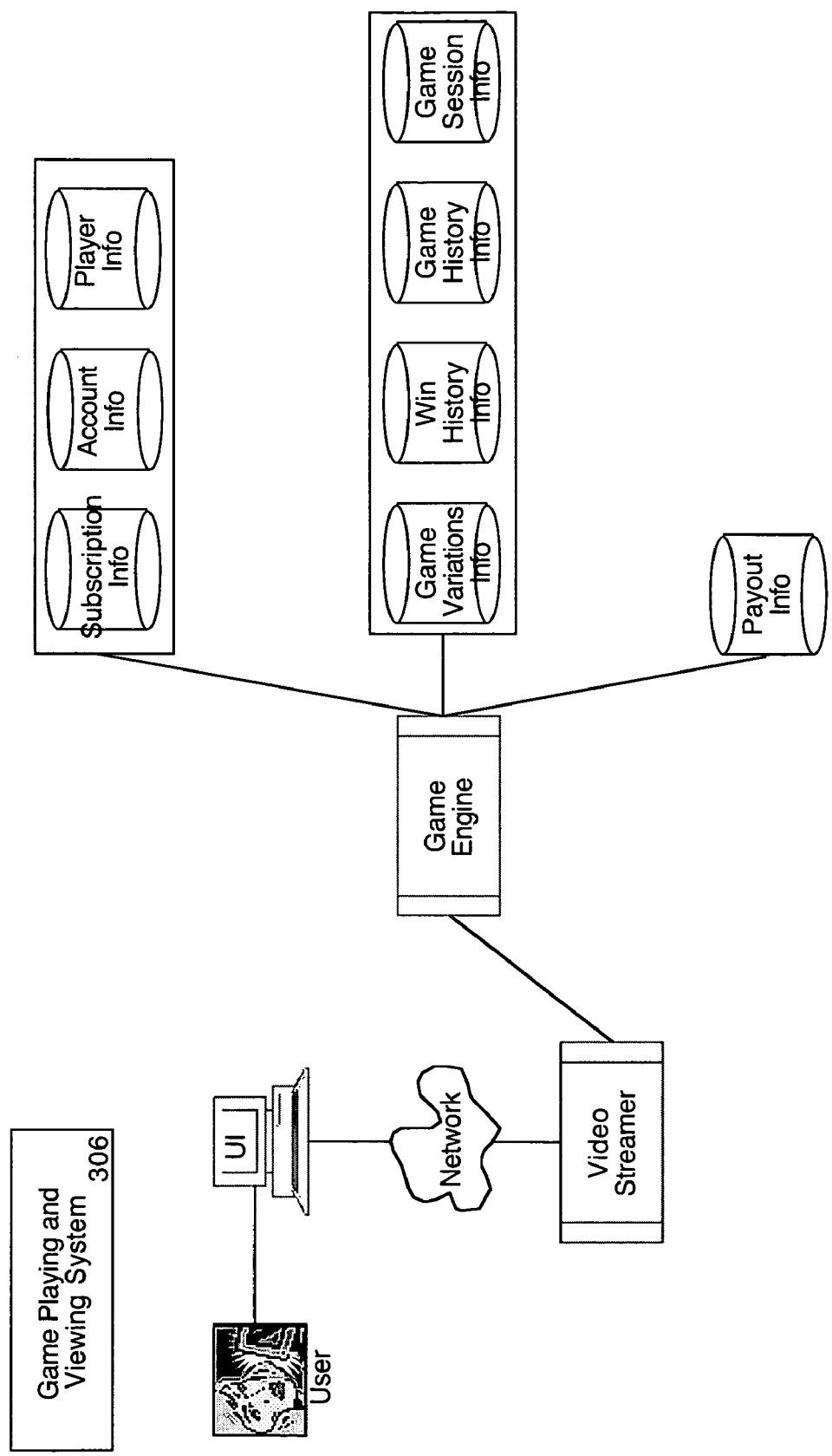
FIG. 5 is a diagram showing components of a game playing and viewing subsystem according to one embodiment of the invention.

A game playing and viewing system (e.g., FIG. 5) according to one embodiment of the invention may comprise a number of components for performing specific functions. The components may include storage systems or devices that store data structures having information relating to game information and game play. For example, such information may include game variation information, present game information, game session history and win history. A game playing and viewing system may also have components to access the payment and payout data structures.

The game playing and viewing system may also include a game engine. The game engine may, according to one embodiment, run a game program following the above process. The above-mentioned process for conducting a game is merely an illustrative embodiment of the method of game play for a game engine. Such an illustrative embodiment is not intended to limit the scope of the invention, as any of numerous other implementations of the method of game play for a game engine. For example, variations of the rules are possible and are intended to fall within the scope of the invention. None of the claims set forth below are intended to be limited to any particular implementation of the method of game play for a game engine, unless such claim includes a limitation explicitly reciting a particular implementation.

Game rules, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system (e.g., the computer system described below in relation to FIG. 6) that perform the functions described above with respect to the process for conducting a dice-based game as discussed above can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite or wireless medium to a user interface. If the game is played completely automatically, the user interface may be merely a video terminal including a display with no user input means (e.g., a television). Viewing access may be controlled by standard means for conditional access including using set top box addresses, telephone numbers or internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 300, and components thereof such as the payment, payout and game engines, may be implemented using software (e.g., C, C#, C++, Java, or a combination thereof), hardware (e.g., one or more application-specific integrated circuits), firmware (e.g., electrically-programmed memory) or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 6 and 7.

System 300 is merely an illustrative embodiment of the game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game piece or card selection, drawing winning cell content, daubing matching cell content on game cards, determining winners and paying winners. It should be appreciated that the system may perform other functions, including network communication, and the invention is not limited to having any particular function or set of functions.

Figure 6:
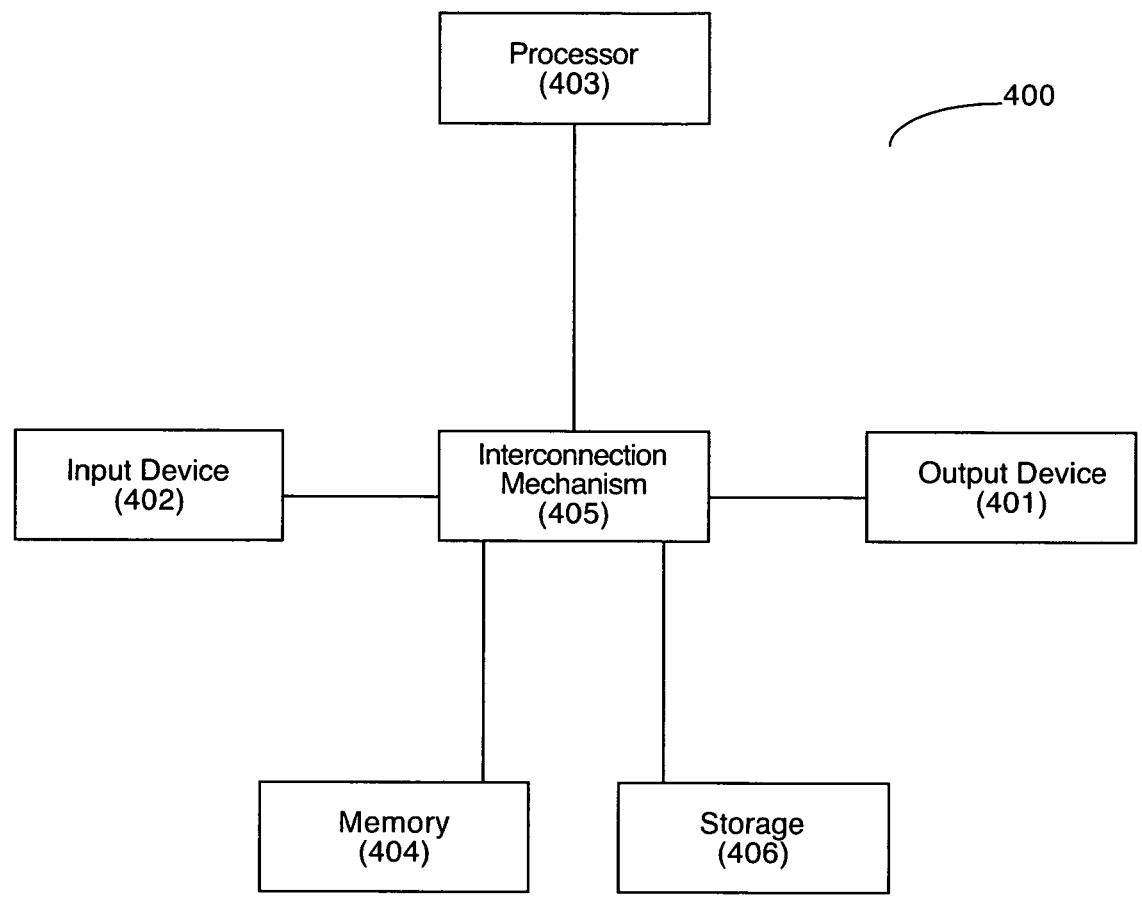
FIG. 6 is a block diagram of a general-purpose computer system upon which various embodiments of the invention may be implemented.

For example, various aspects of the invention may be implemented as specialized software executing in a general-purpose computer system 400 such as that shown in FIG. 6. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 7:
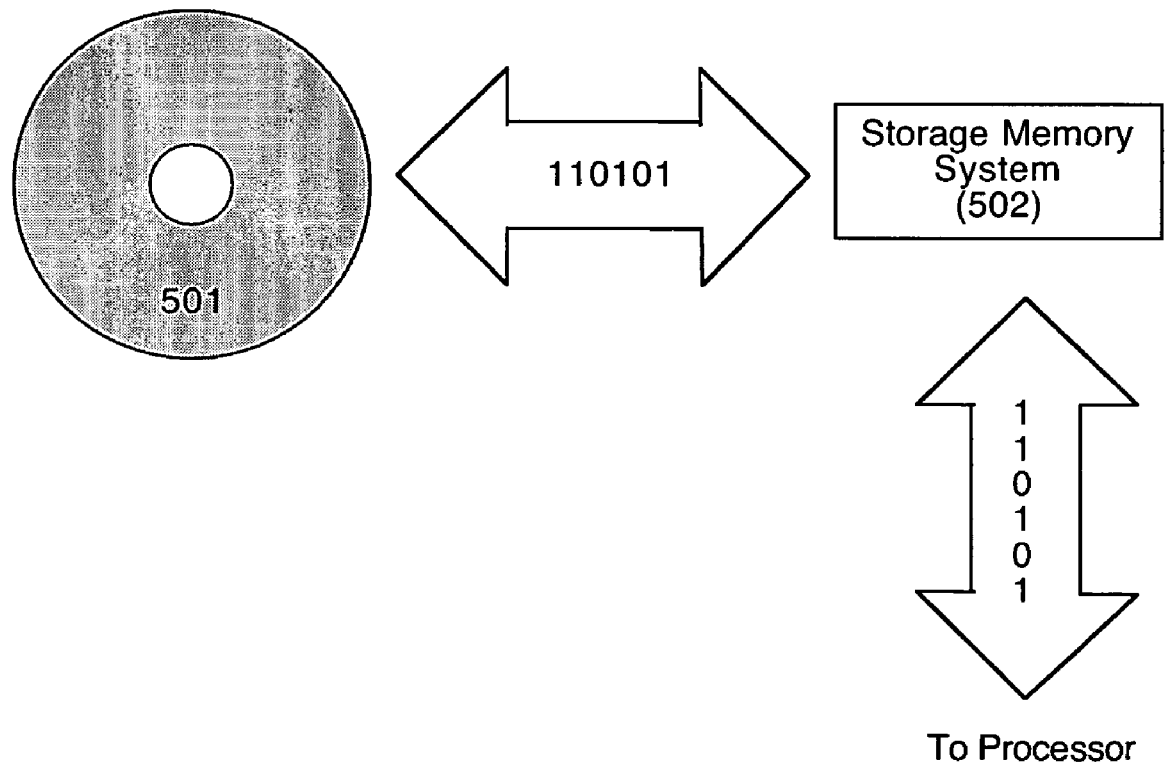
FIG. 7 is a block diagram of a computer data storage system with which various embodiments of the invention may be practiced.

The storage system 406, shown in greater detail in FIG. 7, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for conducting a game having an associated multiplayer game session to be played by a plurality of players, wherein the multiplayer game session comprises one or more cards played by each of the plurality of players and two or more dice, wherein each one of the one or more cards shows dice combinations that can be chosen, and wherein the method comprises acts of:
  A) selecting a plurality of players to begin play of the associated multiplayer game session;
  B) rolling, in a respective turn of at least one of the plurality of players, the two or more dice in the multiplayer game session played by the plurality of players, wherein each of the plurality of players takes a respective turn among the plurality of players within the multiplayer game session on a plurality of computer systems;
  C) choosing, by the at least one of the plurality of players, zero or more of the two or more dice to not roll again;
  D) if necessary, rolling the dice not chosen;
  E) if necessary, repeating steps C and D;
  F) choosing, by the at least one of the plurality of players, at least one of the dice combinations on the one or more cards in which to score a final dice combination; and
  G) concluding the associated multiplayer game session in response to each player of the plurality of players completing their respective turns of the associated multiplayer game session.

2. The method according to claim 1, wherein the at least one of the plurality of players pays to play with at least one of money and loyalty points.

3. The method according to claim 2, wherein the at least one of the plurality of players pays by at least one of cash, a debit card, a credit card, an account credit, and a loyalty program credit.

4. The method according to claim 2, wherein at least one of the plurality of players pays over the Internet, by phone or by cashier.

5. The method according to claim 4, wherein the at least one of the plurality of players pays to play in the game session at at least one of a casino and a lottery outlet.

6. The method according to claim 1, wherein at least one of the plurality of players is allowed to create a subscription to play multiple game sessions.

7. The method according to claim 6, wherein at least one of the plurality of players is allowed to automatically renew the subscription.

8. The method according to claim 1, wherein the payout for winning to a winning player is increased with increased payment by the winning player to play.

9. The method according to claim 1, wherein the payout for winning is divided among all of one or more winning players.

10. The method according to claim 1, wherein there is at least one progressive jackpot.

11. The method according to claim 1, wherein the payout table is not directly determined by the odds of winning with or without a fee to the gaming operator.

12. The method according to claim 1, wherein the payout for winning may be at least one of money, credit, merchandise, and loyalty points.

13. The method according to claim 1, wherein the payout for winning money is performed by providing at least one of cash, a check, a debit card, and an account credit.

14. The method according to claim 1, wherein the payout for winning loyalty points is performed by providing at least one of a loyalty program credit and an account credit.

15. The method according to claim 1, wherein game sessions are run continually.

16. The method according to claim 1, wherein a winning player among the plurality of players and a winning game card are verified and authenticated by at least one of the gaming operator and a computer system that conducts the game session.

17. The method according to claim 1, wherein a game playing computer system displays to all players at least one of the winning game card and the winning player.

18. The method according to claim 1, wherein a game playing computer system determines at least one of a game card or a player with the highest score following each roll of the two or more dice.

19. The method according to claim 1, wherein a game playing computer system automatically notifies a player of winnings.

20. The method according to claim 1, wherein at least one of the plurality of players may access his/her results for past gaming sessions at a location remote to the game playing computer system.

21. The method according to claim 20, wherein the results for past gaming sessions include indications of at least one of wins, payouts, and losses.

22. The method according to claim 21, wherein the at least one player gains remote access through at least one of a group including a kiosk, a phone, a handheld device, a television and a computer.

23. The method according to claim 1, wherein the games are run continually, and wherein one or more advertising streams are inserted into the display during the game session.

24. The method according to claim 1, wherein the at least one of the plurality of players may enter a game through an alternative method of entry (AMOE).

25. The method according to claim 1, wherein each of the plurality of players is provided two or more cards.

26. The method according to claim 1, wherein each game session includes a winning player.

27. The method according to claim 1, wherein the method includes performing acts B through F for a number of times equal to the number of dice combinations on at least one of the one or more game cards.

28. The method according to claim 1, wherein the at least one of the plurality of players is provided a predetermined amount of time to select dice to keep before the dice not chosen are rolled again.

29. The method according to claim 1, wherein the game session is conducted without interaction with at least one of the plurality of players.

30. The method according to claim 1, wherein at least one of the plurality of players is determined to be a winning player by accruing the most points among the plurality of players.

31. The method according to claim 1, wherein the initial dice combination is the same for each one of the one or more cards.

32. The method according to claim 1, wherein the initial dice combination is different for each one of the one or more cards.

33. A method for conducting a game having an associated multiplayer game session to be played by a plurality of players, wherein the multiplayer game session comprises one or more cards played by each of the plurality of players and two or more dice, wherein each one of the one or more cards shows dice combinations that can be chosen, and wherein the method comprises acts of:
  A) selecting a plurality of players to begin play of the associated multiplayer game session;
  B) rolling, in a respective turn of at least one of the plurality of players, the two or more dice in the multiplayer game session played by the plurality of players, wherein each player of the plurality of players plays their respective turns among the plurality of players within the associated multiplayer game session substantially simultaneously on a plurality of computer systems;

C) choosing, by the at least one of the plurality of players, zero or more of the two or more dice to not roll again;
D) if necessary, rolling the dice not chosen;
E) if necessary, repeating steps B and C; and
F) choosing, by the at least one of the plurality of players, at least one of the dice combinations on the one or more cards in which to score a final dice combination; and
G) concluding the associated multiplayer game session in response to each player of the plurality of players completing their respective turns of the associated multiplayer game session.

\* \* \* \* \*